(12) United States Patent
Kim et al.

(10) Patent No.: US 8,484,209 B2
(45) Date of Patent: Jul. 9, 2013

(54) METHOD, SYSTEM AND COMPUTER-READABLE RECORDING MEDIUM FOR RECOMMENDING OTHER USERS OR OBJECTS BY CONSIDERING AT LEAST ONE USER'S PREFERENCE

(75) Inventors: Tae Hoon Kim, Gyeonggi-do (KR); Min Je Park, Gyeonggi-do (KR); Se Uk Cheon, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/299,294

(22) Filed: Nov. 17, 2011

(65) Prior Publication Data
US 2012/0173561 A1 Jul. 5, 2012

(30) Foreign Application Priority Data
Jan. 4, 2011 (KR) .................. 10-2011-0000651

(51) Int. Cl.
*G06F 17/00* (2006.01)
(52) U.S. Cl.
USPC ........................................... 707/732
(58) Field of Classification Search
USPC ................................................... 707/732
See application file for complete search history.

(56) References Cited

U.S. PATENT DOCUMENTS

| 5,950,200 A * | 9/1999 | Sudai et al. ................. 1/1 |
| 6,735,568 B1 * | 5/2004 | Buckwalter et al. ....... 705/319 |
| 7,454,464 B2 * | 11/2008 | Puthenkulam et al. ..... 709/204 |
| 2004/0249811 A1 * | 12/2004 | Shostack et al. .............. 707/5 |
| 2009/0075738 A1 * | 3/2009 | Pearce ...................... 463/42 |
| 2009/0138806 A1 * | 5/2009 | Galvin et al. .............. 715/753 |
| 2010/0030859 A1 * | 2/2010 | Huang ...................... 709/206 |
| 2011/0191352 A1 * | 8/2011 | Jones et al. ................ 707/749 |

FOREIGN PATENT DOCUMENTS

| KR | 10-2007-0099709 | 10/2007 |
| KR | 10-2009-0130774 | 12/2009 |

\* cited by examiner

*Primary Examiner* — Syed Hasan
*Assistant Examiner* — Kurt Mueller
(74) *Attorney, Agent, or Firm* — Blakely, Sokoloff, Taylor & Zafman LLP (57) ABSTRACT

The present invention relates to a method for recommending other users who have similar preference with a user. The method includes the steps of: acquiring information on objects selected by a user and other users; acquiring information on topics; determining to which topic the user and the other users respectively correspond; evaluating a degree of user similarity by each other user, the degree of user similarity being relevant to sum of probabilities of the specific object appearing in the state of a topic while k-th other user and the user have the topic as a probability of the k-th other user and the user having selected the specific object, by referring to correspondence relationships; and recommending specific other users who have a high degree of user similarity, wherein the degree of user similarity is evaluated by multiplying the sum by a probability of the specific object appearing independently.

17 Claims, 4 Drawing Sheets

METHOD, SYSTEM AND COMPUTER-READABLE RECORDING MEDIUM FOR RECOMMENDING OTHER USERS OR OBJECTS BY CONSIDERING AT LEAST ONE USER'S PREFERENCE

CROSS-REFERENCE TO RELATED APPLICATION

This application claims priority to and incorporates herein by reference all disclosure in Korean Patent Application No. 10-2011-0000651 filed Jan. 4, 2011.

TECHNICAL FIELD

The present invention relates to a method, a system and a computer-readable recording medium for recommending other users or objects by considering at least one user's preference; and more particularly, to the method, the system and the computer-readable recording medium for (i) recommending a specific other user more widely and more accurately, by acquiring information on objects pre-selected respectively by a specific user and random other users, dividing the objects into groups in reference to a characteristic(s) of each object to obtain information on topics, determining to which topic information the specific user and the random other users correspond, evaluating degrees of user similarity between the specific user and the random other users in reference to correspondence relationships between user information and topic information and those between topic information and object information and then recommending a specific other user with a high degree of user similarity among the random other users as an appropriate user with similar preference with the specific user; or (ii) recommending a specific object more widely and more accurately, by evaluating a degree of object similarity between the specific user and each object in reference to correspondence relationships between the specific user and the topic information and those between the topic information and the object information, determining a specific object which ranks top in terms of the degree of object similarity as an appropriate object with a high relevance to the specific user and then recommending the specific object to the specific other user which ranks top in terms of the degree of user similarity.

BACKGROUND OF THE INVENTION

Due to the dramatic development of Internet technologies, social networking services (SNS) which provide a variety of services by establishing and using a network among users via the Internet recently have been popular.

In particular, one of the most essential functions of the SNS is to introduce many other users to a specific user and gives the specific user a chance to widen his or her social network (so called, a function of recommending friends). One of the existing technologies, which are introduced many times, as such a friend recommendation technology was a technology for analyzing the information on objects which users have their interest in and recommending other users with similar preference to a specific user. For example, if user A usually visits Starbucks and Coffee Bean among various coffee shops and user B mainly visits Tom N Toms and Passcucci while user C loves Starbucks and Caffebene, the technology is to recommend the user C who is considered to have more similar preference with the user A.

In case of the existing technology which simply used correspondence relationships between users and objects, because the types of objects are too voluminous, one same specific object was not very frequently selected. Therefore, it was really difficult to find users with similar preference with the user A. In short, in the aforementioned example, if there is no coffee shop in which the users A, B and C are jointly interested, even though all the users like coffee, the users were classified as users with dissimilar preference. If it is assumed that there are various types of products beyond coffee shops having relatively fewer types, users might face the problem more seriously.

Accordingly, the applicant of the present invention came to develop a technology for introducing a concept of topic which is a more comprehensive concept than a concept of object to thereby evaluate degrees of similarity between each user more widely and supporting the recommendation of a specific object with a high degree of relationship with a specific user to other users who have similar preference with the specific user.

SUMMARY OF THE INVENTION

It is an object of the present invention to solve all the problems mentioned above.

It is another object of the present invention to acquire information on topics by dividing objects into groups in reference to a common characteristic(s) of each object selected by users and find other users with similar preference with a specific user more widely and more accurately by using such topic information.

It is still another object of the present invention to recommend a specific object pre-selected by the specific user to other users who have similar preference with the specific user more rapidly and more accurately.

In accordance with one aspect of the present invention, there is provided a method for recommending other users who have similar preference with a specific user including the steps of: (a) acquiring information on objects selected, respectively, by a specific user and random other users, wherein the random other users include 1-st to r-th other users while the objects include 1-st to s-th objects and a specific object is selected among the 1-st to s-th objects by the specific user; (b) acquiring information on topics which include 1-st to n-th topics by dividing the objects into n groups by referring to characteristic(S) of each object; (c) determining to which topic the specific user and the random other users respectively correspond; (d) evaluating a degree of user similarity by each random other user, the degree of user similarity being relevant to a value equivalent to sum of probabilities of the specific object appearing in the state of a random topic while a k-th other user and the specific user have relationships with the random topic among the 1-st to n-th topics as a probability of the k-th other user and the specific user, at the same time, having selected the specific object, by referring to correspondence relationships between user information which includes information on the specific user and the random other users and topic information and those between the topic information and object information, wherein k is one or more and r or less; and (e) recommending one or more specific other users among the random other users who are ranked in top levels in terms of the degree of user similarity as appropriate users who have similar preference with the specific user, wherein, at the step (d), the degree of user similarity is evaluated by multiplying the value by a probability of the specific object appearing independently.

In accordance with another aspect of the present invention, there is provided a method for recommending a specific object(s) corresponding to preference of a specific user to other users, including the steps of: (a) acquiring information on object(s) the specific user pre-selected among the whole objects; (b) acquiring information on topics which include 1-st to n-th topics by dividing the objects into n groups in reference to characteristic(s) of each object; (c) determining to which topic the specific user corresponds by referring to the information on the object(s) pre-selected by the specific user; (d) evaluating a degree of object similarity relevant to a value equivalent to sum of probabilities of objects pre-selected by the specific user appearing in the state of a random topic while the specific user has relationships with the random topic among the 1-st to n-th topics, by referring to correspondence relationships between information on the specific user and topic information and those between the topic information and object information and then determining k specific objects which rank top k in terms of the degree of object similarity as appropriate specific objects with top k relevances to the specific user; and (e) providing information on the k specific objects to a specific other user with a high relevance to the specific user, wherein, if the specific user includes 1-st to m-th users, the degree of object similarity relevant to a value equivalent to sum of probabilities of specific objects pre-selected by m specific users appearing in the state of a random topic while the 1-st to m-th specific users have relationships with the random topic among 1-st to n-th topics is evaluated and the k specific objects which rank top k in terms of the degree of object similarity are determined.

In accordance with still another aspect of the present invention, there is provided a method for recommending specific object(s) corresponding to preference of a specific user to other users, including the steps of: (a) acquiring information on an object(s) the specific user pre-selected among the whole objects; (b) acquiring information on topics which include 1-st to n-th topics by dividing the objects into n groups by referring to characteristic(s) of each object; (c) determining to which topic the specific user corresponds by referring to the information on the object(s) pre-selected by the specific user; (d) determining information on top h topics which have top h probabilities among respective probabilities of the specific user having relationships with respective topics and then determining top k objects with top k probabilities among respective probabilities of respective objects appearing in the state of the top h topics as appropriate specific objects with the highest relevance to the specific user, by referring to correspondence relationships between information on the specific user and the topic information and those between the topic information and object information; and (e) providing information on the k specific objects to a specific other user with a high relevance to the specific user, wherein, if the specific user includes 1-st to m-th users, the information on the top h topics which have top h probabilities among the respective probabilities of the 1-st to m-th users having relationships with respective topics is determined and then the top k objects with top k probabilities among the respective probabilities of the respective objects appearing in the state of the top h topics are determined as the appropriate specific objects.

In accordance with still another aspect of the present invention, there is provided a system for recommending specific other users who have similar preference with a specific user including: a correspondence relationships determining part for (i) acquiring information on objects selected, respectively, by a specific user and random other users, wherein the random other users include 1-st to r-th other users while the objects include 1-st to s-th objects and a specific object is selected among the 1-st to s-th objects by the specific user, (ii) acquiring information on topics which include 1-st to n-th topics by dividing the objects into n groups by referring to characteristic(s) of each object and (iii) determining to which topic the specific user and the random other users respectively correspond; a similarity degree evaluating part for evaluating a degree of user similarity by each random other user, the degree of user similarity being relevant to a value equivalent to sum of probabilities of the specific object appearing in the state of a random topic while a k-th other user and the specific user have relationships with the random topic among the 1-st to n-th topics as a probability of the k-th other user and the specific user, at the same time, having selected the specific object, by referring to correspondence relationships between user information which includes information on the specific user and the random other users and topic information and those between the topic information and object information, wherein k is one or more and r or less; and a recommendation information providing part for recommending one or more specific other users among the random other users who are ranked in top levels in terms of the degree of user similarity as appropriate users who have similar preference with the specific user, wherein the similarity degree evaluating part evaluates the degree of user similarity by multiplying the value by a probability of the specific object appearing independently.

In accordance with still another aspect of the present invention, there is provided a system for recommending a specific object(s) corresponding to preference of a specific user to other users, including: a correspondence relationships determining part for (i) acquiring information on topics which include 1-st to n-th topics by dividing objects into n groups in reference to characteristic(s) of each object, (ii) acquiring information on an object(s) the specific user pre-selected among the whole objects, and (iii) determining to which topic the specific user corresponds by referring to the information on the object(s) pre-selected by the specific user; a similarity degree evaluating part for evaluating a degree of object similarity relevant to a value equivalent to sum of probabilities of objects pre-selected by the specific user appearing in the state of a random topic while the specific user has relationships with the random topic among the 1-st to n-th topics, by referring to correspondence relationships between information on the specific user, and topic information and those between the topic information and object information and then determining k specific objects which rank top k in terms of the degree of object similarity as appropriate specific objects with top k relevances to the specific user; and a recommendation information providing part for providing information on the k specific objects to a specific other user with a high relevance to the specific user, wherein, if the specific user includes 1-st to m-th users, the similarity degree evaluating part evaluates the degree of object similarity relevant to a value equivalent to sum of probabilities of specific objects pre-selected by m specific users appearing in the state of a random topic while the 1-st to m-th specific users have relationships with the random topic among 1-st to n-th topics and determines the k specific objects which rank top k in terms of the degree of object similarity.

In accordance with still another aspect of the present invention, there is provided a system for recommending specific object(s) corresponding to preference of a specific user to other users, including: a correspondence relationships determining part for (i) acquiring information on topics which include 1-st to n-th topics by dividing objects into n groups by referring to characteristic(s) of each object, (ii) acquiring information on an object(s) the specific user pre-selected among the whole objects, (iii) determining to which topic the specific user corresponds by referring to the information on the object(s) pre-selected by the specific user; a similarity degree evaluating part for determining information on top h topics which have top h probabilities among respective probabilities of the specific user having relationships with respective topics and then determining top k objects with top k probabilities among respective probabilities of respective objects appearing in the state of the top h topics as appropriate specific objects with the highest relevance to the specific user, by referring to correspondence relationships between information on the specific user and the topic information and those between the topic information and object information; and a recommendation information providing part for providing information on the k specific objects to a specific other user with a high relevance to the specific user, wherein, if the specific user includes 1-st to m-th users, the similarity degree evaluating part determines the information on the top h topics which have top h probabilities among the respective probabilities of the 1-st to m-th users having relationships with respective topics and then determines the top k objects with top k probabilities among the respective probabilities of the respective objects appearing in the state of the top h topics as the appropriate specific objects.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a topic (or topic information) may be understood to mean information on grouped objects with common characteristics acquired by referring to the characteristic(s) of each object around users. For instance, if Sonata, Avante, Matiz and Genesis are objects selectable by a user(s), the objects have common characteristics: one is that they are all vehicles and the other is that they are made in Korea. Therefore, they may be classified as various topics, i.e., a topic of vehicle and a topic of Korea. By reference, the topic information may be in a hidden state without being disclosed to users.

Configuration of the Whole System

Figure 1:
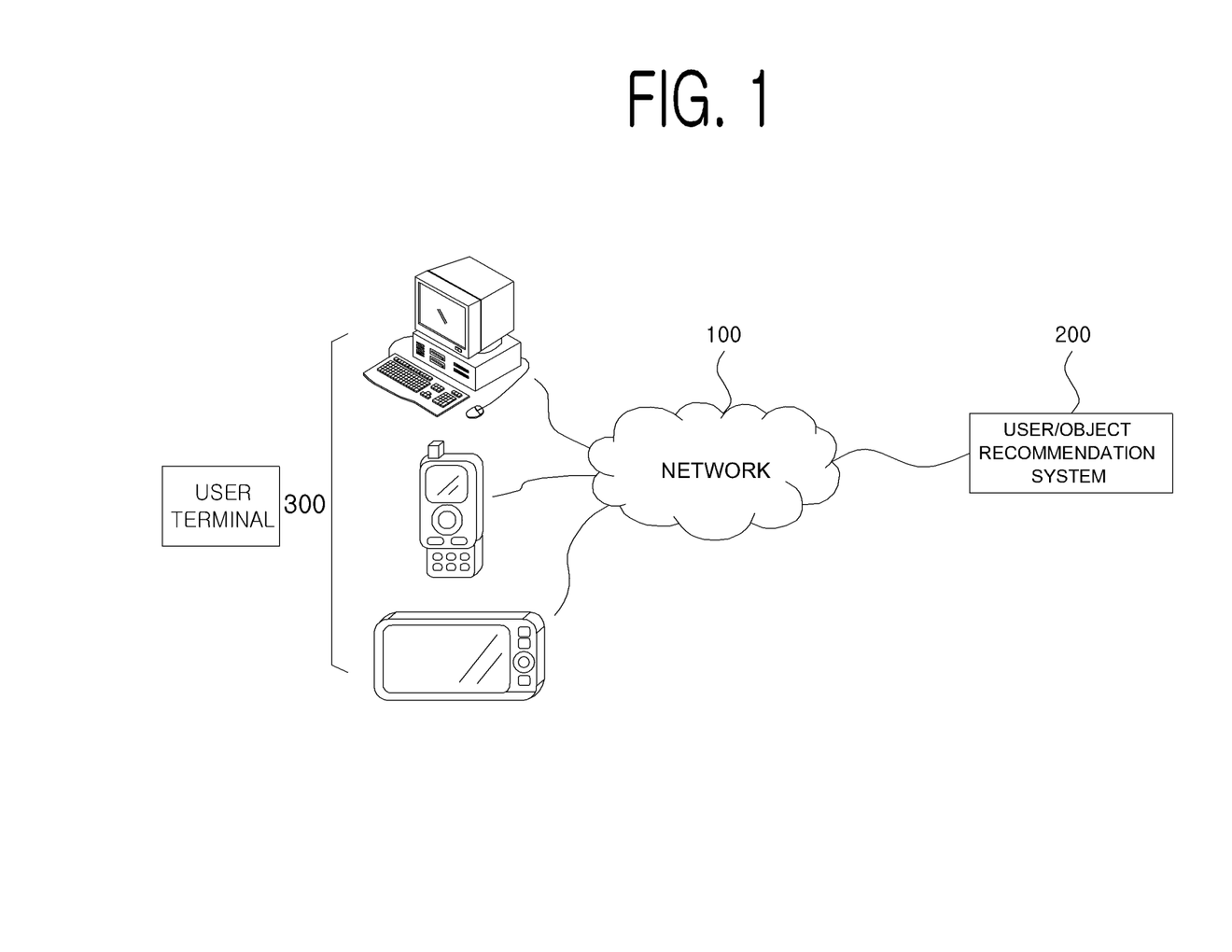
FIG. 1 is a diagram briefly representing the configuration of the whole system for recommending other users and objects by considering a specific user's preference.

FIG. 1 is a diagram briefly representing the configuration of the whole system for recommending other users and objects with similar preference with a user in accordance with an example embodiment of the present invention.

As illustrated in FIG. 1, the whole system in accordance with an example embodiment of the present invention may include a network 100, a user/object recommendation system 200 and a user terminal 300.

First, the network 100 in accordance with an example embodiment of the present invention may be configured regardless of wired or wireless and may be configured in a form of a mobile telecommunication network, a local area network (LAN), a metropolitan area network (MAN), a wide area network (WAN), an artificial satellite network and other diverse networks. More particularly, the network 100 in the present invention should be understood as a concept inclusive of all network services such as publicly known World Wide Web (www), Code Division Multiple Access (CDMA), Wideband Code Division Multiple Access (WCDMA), Global System for Mobile communications (GSM) and the like.

Next, the user/object recommendation system 200 in accordance with an example embodiment of the present invention may perform a function of acquiring information on objects pre-selected, respectively, by a specific user and random other users as well as information on topics falling under respective objects, and determining to which topic the specific user and the random other users, respectively, correspond based on the acquired information.

Furthermore, the user/object recommendation system 200 in accordance with an example embodiment of the present invention may conduct a function of determining a specific other user among the random other users with a high relevance to the specific user and recommending the specific other user as an appropriate user with similar preference with the specific user by referring to correspondence relationships between user information, i.e., information on the specific user and the random other users, and topic information and also those between the topic information and object information.

Besides, the user/object recommendation system 200 in accordance with an example embodiment of the present invention may carry out a function of determining a specific object with a high relevance to the specific user by referring to correspondence relationships between the user information, i.e., the specific user and the random other users, and the topic information and also those between the topic information and the object information and a function of recommending information on the specific object to specific other users with a high relevance to the specific user.

The detailed explanation on an internal configuration and components of the user/object recommendation system 200 will be made below. By reference, the user/object recommendation system 200 may also be configured separately as a user recommendation system and an object recommendation system.

In addition, the user terminal 300 in accordance with an example embodiment of the present invention may perform a function of transmitting a request for selection to the user/object recommendation system 200 if a user selects an object the user is interested in and also a function of receiving and getting information on other users or objects recommended as those with similar preference with the user by the user/object recommendation system 200. Herein, a case may be assumed that the user selects information on a random object by collecting information thereon. A typical example of such a collection might be that user creates a digital image of the random object by using a camera module, etc. of the user terminal 300 and registers its information but it is not limited thereto.

Furthermore, the user terminal 300 in accordance with an example embodiment of the present invention is a digital device which includes a function for accessing to the network 100 or the user/object recommendation system 200 and communicating with it. Such digital devices, including a personal computer (e.g., desktop, laptop, etc.), a workstation, a PDA, a web pad, a cellular phone, which have memory means and micro processors with a calculation ability, may be adopted as the user terminal 300 in accordance with the present invention.

Configuration of the User/Object Recommendation System

Figure 2:
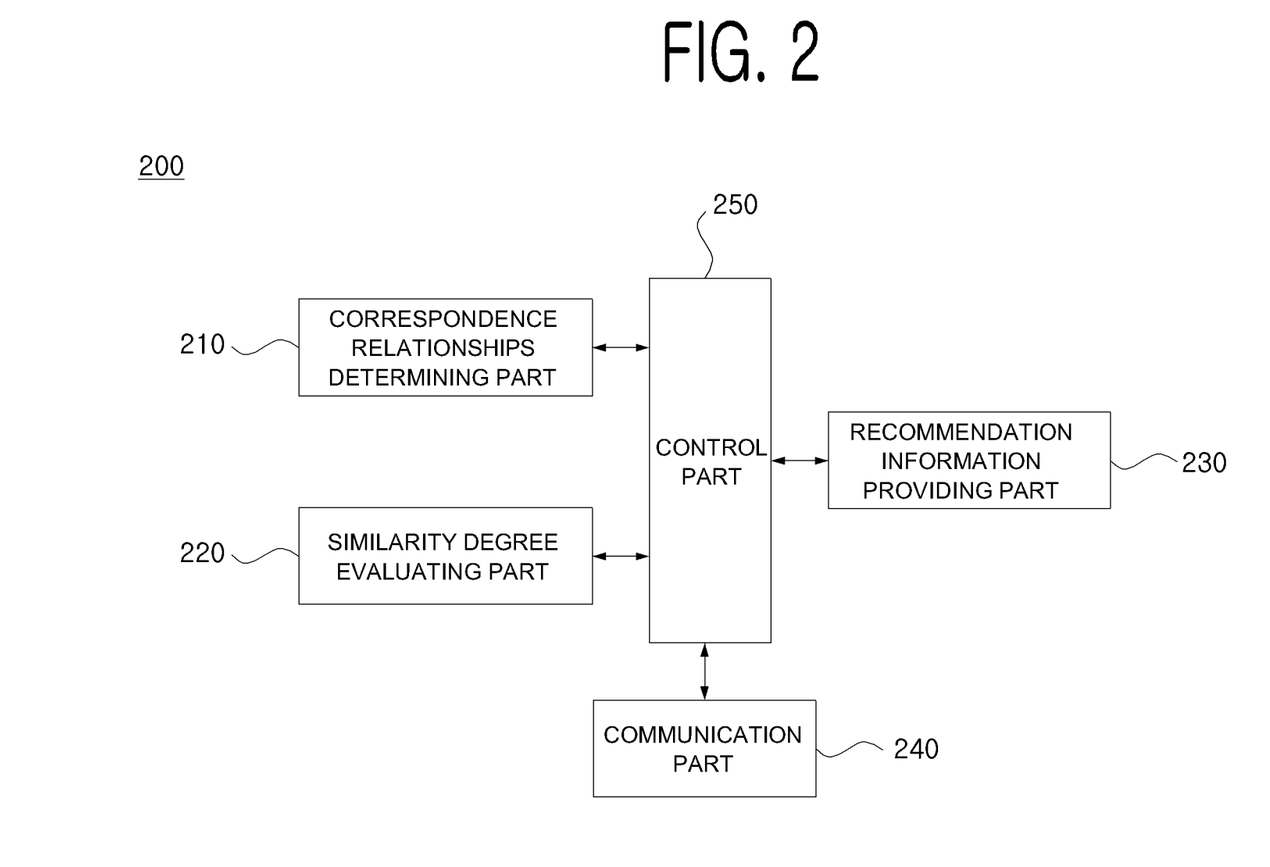
FIG. 2 is a drawing that exemplarily shows the internal configuration of a user/object recommendation system 200 in accordance with an example embodiment of the present invention.

FIG. 2 is a drawing that exemplarily shows the internal configuration of a user/object recommendation system 200 in accordance with an example embodiment of the present invention.

By referring to FIG. 2, the user/object recommendation system 200 may include a correspondence relationships determining part 210, a similarity degree evaluating part 220, a recommendation information providing part 230, a communication part 240 and a control part 250.

In accordance with an example embodiment of the present invention, at least one of the correspondence relationships determining part 210, the similarity degree evaluating part 220, the recommendation information providing part 230, the communication part 240 and the control part 250 may be included in the user/object recommendation system 200 or may be program modules communicating with the user/object recommendation system 200. In FIG. 2, the user/object recommendation system 200 is illustrated to include the correspondence relationships determining part 210, the similarity degree evaluating part 220, the recommendation information providing part 230, the communication part 240 and the control part 250. The program modules may be included in the user/object recommendation system 200 in a form of an operating system, an application program module and other program module and may be also stored on known several memory devices physically. Furthermore, the program modules may be stored on remote memory devices communicable to the user/object recommendation system 200. The program modules may include but not be subject to a routine, a sub-routine, a program, an object, a component, and a data structure for executing a specific operation or a type of specific abstract data that will be described in accordance with the present invention.

First of all, in accordance with a first example embodiment of the present invention, the correspondence relationships determining part 210 may perform a function of acquiring information on objects pre-selected separately by a specific user and random other users, dividing the objects into groups as topics by referring to a characteristic(s) of each object and determining to which topic the specific user and the random other users correspond. As such, to do as mentioned above, the correspondence relationships determining part 210 may be linked with a database (not illustrated) where information on users and objects and information on the relationships of correspondence between the users and the objects is recorded. Hereinafter, on assumption that the random other users include 1-st to r-th users; the objects include 1-st to s-th objects; and the specific user has already selected at least one specific object among the 1-st to s-th objects, the explanation will be made.

Next, to get probability of a k-th other user (where k is 1 or more and r or less) among the random other users having selected a specific object at the same time with the specific user by referring to correspondence relationships between the user information, i.e., information on the specific user and the random other users, and the topic information and those between the topic information and the object information, the similarity degree evaluating part 220 in accordance with the first example embodiment of the present invention may perform a function of acquiring a degree of user similarity by each random other user which is relevant to a value equivalent to sum of all the probabilities of the specific object appearing relating to information on n topics, i.e., from 1-st to n-th topics, while the k-th other user and the specific user respectively have relationships with a random topic among the n topics.

More specifically, the similarity degree evaluating part 220 may get the degree of user similarity by multiplying the value equivalent to sum of all the probabilities of the specific object appearing relating to random topic information while the k-th other user and the specific user respectively have the random topic information among the information on the n topics by a probability of the specific object appearing independently (i.e., a concept of frequency as the probability of the specific object appearing among the whole objects recorded on a database (which is not illustrated)). The probability of the k-th other user and the specific user having relationships with the random topic among 1-st to n-th topics may be calculated by multiplying a probability of the k-th other user having relationships with the random topic among 1-st to n-th topics by a probability of the specific user having relationships with the same topic.

A process of evaluating the degree of user similarity may be expressed in the mathematical formula 1 as follows:

$$P(U, O) = P(O) \sum_T P(O|T) P(T|U) \qquad \text{[Mathematical Formula 1]}$$

As seen in the mathematical formula 1, P(U,O) as the probability of a user (U) having selected a specific object (O) may be calculated by multiplying the sum of each probability (P(O|T)) of the specific object appearing at the state of information on each topic while the specific user has relationships with a random topic among 1-st to n-th topics (P(T|U)) by the probability of the specific object appearing independently (P(O)). Based on this, a process of evaluating the probability of the k-th other user having selected the specific object at the same time with the specific user is shown below by referring to FIG. 3.

Figure 3:
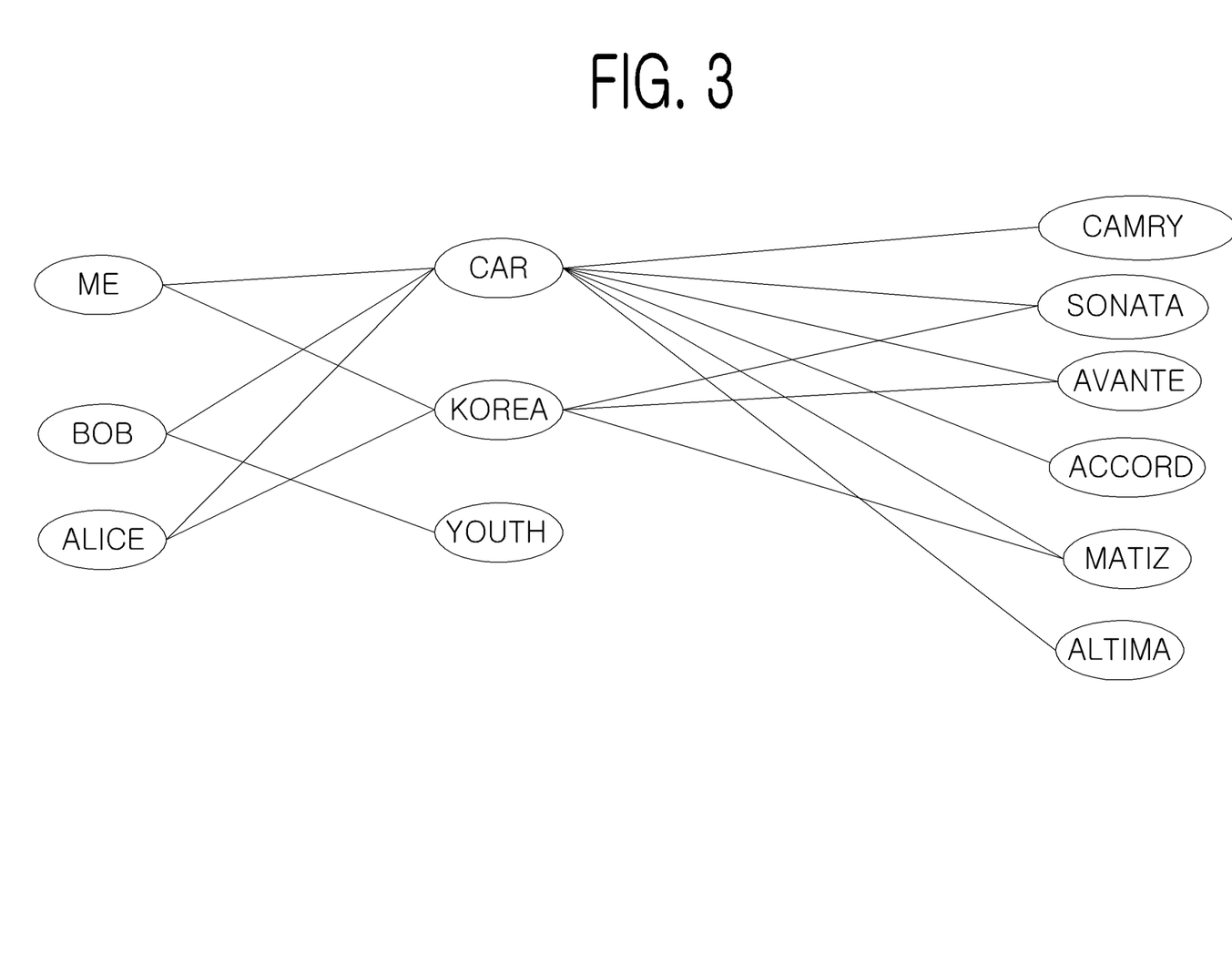
FIG. 3 is a diagram exemplarily showing correspondence relationships between user information and topic information and those between the topic information and objet information.

FIG. 3 is a diagram exemplarily showing correspondence relationships between the user information and the topic information and those between the topic information and the objet information.

By referring to FIG. 3, a user "me" selected objects: Camry, Sonata and Avante while another user "Bob" Accord and the other user "Alice" Matiz and Altima. The correspondence relationships determining part 210 may acquire topic information relating to the information on the above-mentioned pre-selected objects (e.g., a topic of car or a topic of Korea; a topic of youth does not correspond to the aforementioned objects) and the relating correspondence relationships and the similarity degree evaluating part 220 may determine to which other user the specific user with respect to the specific objects has a high relevance by using the correspondence relationships (i.e., degrees of user similarity).

For instance, in case of a parameter Sonata pre-selected by the specific user "me", P(Sonata, me, Bob) as a degree of user similarity between the specific user "me" and the another user "Bob" (i.e., the probability of "me" and "Bob" having selected Sonata at the same time) and P(Sonata, me, Alice), as a degree of user similarity between the specific user "me" and the other user "Alice" (i.e., the probability of "me" and "Alice" having selected Sonata at the same time) may be calculated by using the mathematical formula 1 as below, where it could be found out that all related topics (i.e., car and Korea) are used as parameters:

$$P(\text{Sonata, me, Bob}) = P(\text{Sonata}) * (P(\text{car}|\text{me, Bob}) * P(\text{Sonata}|\text{car}) + \quad 1)$$
$$P(\text{Korea}|\text{me, Bob}) * P(\text{Sonata}|\text{Korea}))$$
$$= P(\text{Sonata}) * P(\text{car}|\text{me}) * P(\text{car}|\text{Bob}) *$$
$$P(\text{Sonata}|\text{car}) + P(\text{Korea}|\text{me}) * P(\text{Korea}|\text{Bob}) *$$
$$P(\text{Sonata}|\text{Korea})$$
$$= \frac{1}{6} * \left(\frac{1}{2} * \frac{1}{2} * \frac{1}{6} + \frac{1}{2} * 0 * \frac{1}{3}\right) = \frac{1}{144}$$

$$P(\text{Sonata, me, Alice}) = P(\text{Sonata}) * (P(\text{car}|\text{me, Alice}) * P(\text{Sonta}|\text{car}) + \quad 2)$$
$$P(\text{Korea}|\text{me, Alice}) * P(\text{Sonata}|\text{Korea}))$$
$$= P(\text{Sonata}) * P(\text{car}|\text{me}) * P(\text{car}|\text{Alice}) *$$
$$P(\text{Sonata}|\text{car}) + P(\text{Korea}|\text{me}) * P(\text{Korea}|\text{Alice}) *$$
$$P(\text{Sonata}|\text{Korea})$$
$$= \frac{1}{6} * \left(\frac{1}{2} * \frac{1}{2} * \frac{1}{6} + \frac{1}{2} * \frac{1}{2} * \frac{1}{3}\right) = \frac{1}{48}$$

In conclusion, if Sonata is used as a parameter, it is calculated that "Alice" rather than "Bob" has a higher degree of similarity with the specific user "me". It is because, while "Alice" is much interested in topics car and Korea just as "me", "Bob" is interested in the topics car as well as youth instead of the topic Korea.

At the similarity degree evaluating part 220 in accordance with the first example embodiment of the present invention, the m:n matching, on the other hand, may be assumed to compare the preferences of the whole number of multiple specific users with those of other users to obtain degrees of user similarity and then recommend information on specific other users with similar preference to the specific users by expanding the above-described concept of degrees of user similarity calculated by using the 1:n matching.

To calculate the degrees of user similarity for such a m:n matching, a mathematical formula 2 may be used.

$$P(O, U_1, U_2, \ldots, U_m, U^*) = \quad \text{[Mathematical Formual 2]}$$
$$P(O)\sum_T P(O|T)P(T|U_1, U_2, \ldots, U_m, U^*) =$$
$$P(O)\sum_T P(O|T)P(T|U_1)$$
$$\ldots P(T|U_m)P(T|U^*)$$

If 1-st to m-th specific users are included in the specific users, the similarity degree evaluating part 220, as shown in the mathematical formula 2, may compute the probability of each specific user corresponding to a random topic (i.e., the probability of each specific user having relationships with a random topic) and multiply the probabilities of all the specific users corresponding to the random topic (P(T|U1)* . . . *P(T|Um)) to get a certain probability of 1-st to m-th specific users corresponding to the random topic at the same time among the 1-st to m-th topics and it may calculate a probability of a random other user (i.e., U*) and the 1-st to m-th specific users corresponding the random topic at the same time among the 1-st to m-th topics by multiplying the certain probability by a probability (P(T|U*)) of the random other user (U*) corresponding to the random topic and then evaluate degrees of user similarity between the multiple specific users and the random other user (U*) and also determine a specific other user(s) with a high degree of user similarity with the multiple specific users.

Next, the recommendation information providing part 230 in accordance with the first example embodiment of the present invention may perform a function of recommending the specific other user whose value of user similarity is highest among the 1-st to r-th other users as an appropriate user with similar preference with the specific user.

In addition, the communication part 240 in accordance with the first example embodiment of the present invention may perform a function of allowing the user/object recommendation system 200 to communicate with external devices such as the user terminal 300.

Moreover, the control part 250 in accordance with the first example embodiment of the present invention may carry out a function of controlling data flow among the correspondence relationships determining part 210, the similarity degree evaluating part 220, the recommendation information providing part 230 and the communication part 240. In short, the control part 250 controls the flow of data from outside or among the components of the image-processing system 200 to force the correspondence relationships determining part 210, the similarity degree evaluating part 220, the recommendation information providing part 230 and the communication part 240 to perform their unique functions.

In accordance with the first example embodiment of the present invention, the method for recommending a specific other user with similar preference with the specific user was explained above. Now, a method for recommending a specific object with similar preference with the specific user (i.e., a specific object corresponding to the specific user's preference) to other users will be described below in accordance with a second example embodiment of the present invention.

First, the correspondence relationships determining part 210 in accordance with the second example embodiment of the present invention may conduct a function of acquiring information on objects which are divided into groups as topics (which include 1-st to m-th topics) by referring to a characteristic(s) of each object, getting information on the object(s) pre-selected by the specific user among the information on the whole objects and deciding which topic information the specific user corresponds to by referring to the information on the object(s) pre-selected by the specific user. For this, the correspondence relationships determining part 210 may be linked with a database (not illustrated) where the information on users and objects and the relationships of correspondence between the users and the objects are recorded.

Second, the similarity degree evaluating part 220 in accordance with the second example embodiment of the present invention may perform a function of computing a degree of object similarity which is relevant to a value equivalent to the sum of respective probabilities of respective objects pre-selected by the specific user appearing at the state of a random topic while the specific user has relationships with the random topic among 1-st to n-th topics by referring to correspondence relationships between the specific user and the topic information and those between the topic information and the object information determined by the correspondence relationships determining part 210 and then determining k specific objects which rank top k in terms of the degree of object similarity as appropriate specific objects with top k relevances to the specific user.

The method for determining the specific object with top k relevances to the specific user is not limited to the aforementioned method and the similarity degree evaluating part 220 in accordance with the second example embodiment of the present invention may first determine information on top h topics with top h probabilities among probabilities of the specific user having respective topics among the 1-st to the n-th topics by referring to correspondence relationships between the specific user and the topic information and those between the topic information and the object information and then consider top k specific objects of which probabilities are top k with respect to the top h topics as appropriate specific objects with the highest relevance with the specific user.

Figure 4:
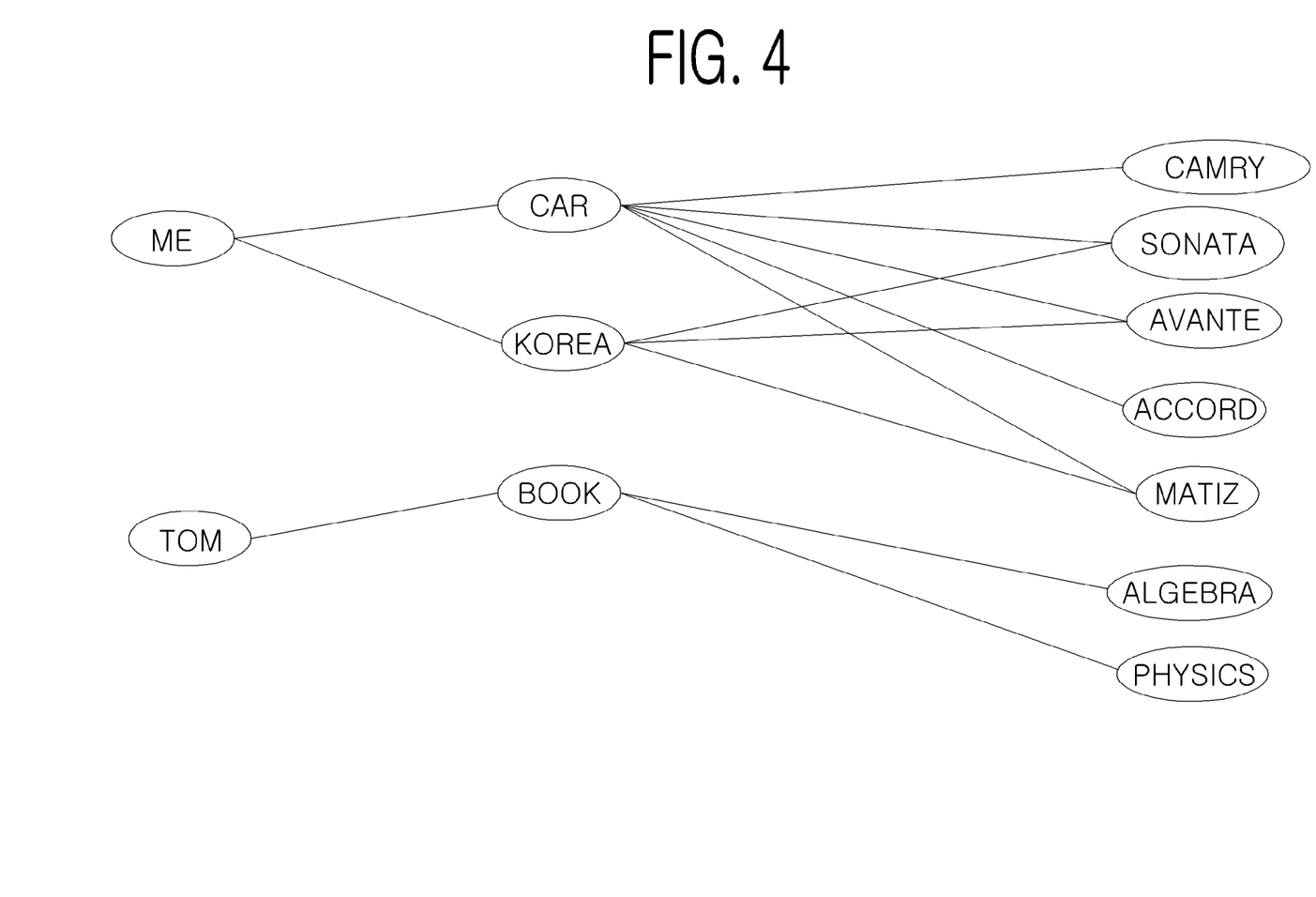
FIG. 4 is a drawing exemplarily representing correspondence relationships between the specific user and the topic information and those between the topic information and the object information.

FIG. 4 is a drawing exemplarily representing correspondence relationships between the specific user and the topic information and those between the topic information and the object information.

By referring to FIG. 4, with respect to a course of the similarity degree evaluating part 220 capable of determining a specific object with the highest relevance to the specific user "me" in accordance with the second example embodiment of the present invention, the similarity degree evaluating part 220 may calculate a degree of object similarity relevant to the sum of the probabilities of respective objects pre-selected by the specific user "me" appearing at the state of a random topic while "me" has the random topic among all the topics, i.e., car, Korea and book as follows:

$$P(\text{Camry, me}) = P(\text{car}|\text{me}) * P(\text{Camry}|\text{car}) + P(\text{Korea}|\text{me}) * \qquad 1)$$
$$P(\text{Camry}|\text{Korea}) + P(\text{book}|\text{me}) * P(\text{Camry}|\text{book})$$
$$= \frac{1}{2} * \frac{1}{5} + \frac{1}{2} * 0 + 0 * 0$$
$$= \frac{1}{10}$$

$$P(\text{Sonata, me}) = P(\text{car}|\text{me}) * P(\text{Sonata}|\text{car}) + P(\text{Korea}|\text{me}) * \qquad 2)$$
$$P(\text{Sonata}|\text{Korea}) + P(\text{book}|\text{me}) * P(\text{Sonata}|\text{book})$$
$$= \frac{1}{2} * \frac{1}{5} + \frac{1}{2} * \frac{1}{3} + 0 * 0$$
$$= \frac{4}{15}$$

$$P(\text{Avante, me}) = P(\text{car}|\text{me}) * P(\text{Avante}|\text{car}) + P(\text{Korea}|\text{me}) * \qquad 3)$$
$$P(\text{Avante}|\text{Korea}) + P(\text{book}|\text{me}) * P(\text{Avante}|\text{book})$$
$$= \frac{1}{2} * \frac{1}{5} + \frac{1}{2} * \frac{1}{3} + 0 * 0$$
$$= \frac{4}{15}$$

$$P(\text{Accord, me}) = P(\text{car}|\text{me}) * P(\text{Accord}|\text{car}) + P(\text{Korea}|\text{me}) * \qquad 4)$$
$$P(\text{Accord}|\text{Korea}) + P(\text{book}|\text{me}) * P(\text{Accord}|\text{book})$$
$$= \frac{1}{2} * \frac{1}{15} + \frac{1}{2} * 0 + 0 * 0$$
$$= \frac{1}{10}$$

$$P(\text{Matiz, me}) = P(\text{car}|\text{me}) * P(\text{Matiz}|\text{car}) + P(\text{Korea}|\text{me}) * \qquad 5)$$
$$P(\text{Matiz}|\text{Korea}) + P(\text{book}|\text{me}) * P(\text{Matiz}|\text{book})$$
$$= \frac{1}{2} * \frac{1}{5} + \frac{1}{2} * \frac{1}{3} + 0 * 0$$
$$= \frac{4}{15}$$

$$P(\text{Algebra, me}) = P(\text{car}|\text{me}) * P(\text{Algebra}|\text{car}) + P(\text{Korea}|\text{me}) * \qquad 6)$$
$$P(\text{Algebra}|\text{Korea}) + P(\text{book}|\text{me}) *$$
$$P(\text{Algebra}|\text{book})$$
$$= 0 * 0 + 0 * 0 + 0 * \frac{1}{2}$$
$$= 0$$

$$P(\text{Physics, me}) = P(\text{car}|\text{me}) * P(\text{Physics}|\text{car}) + P(\text{Korea}|\text{me}) * \qquad 7)$$
$$P(\text{Physics}|\text{Korea}) + P(\text{book}|\text{me}) *$$
$$P(\text{Physics}|\text{book})$$
$$= 0 * 0 + 0 * 0 + 0 * \frac{1}{2}$$
$$= 0$$

In conclusion, Sonata, Avante and Matiz which have the highest degrees of object similarity are determined as appropriate specific objects with highest relevance to the specific user "me", because Sonata, Avante and Matiz correspond to topics car and Korea in which "me" is interested.

As described above, the degree of object similarity between the preference of the user "me" and the object "Algebra" and that between the preference of the user "me" and the object "Physics" are zero respectively because the user "me" is not interested in a topic book to which Algebra and Physics pertain at all. In accordance with the second example embodiment of the present invention, the similarity degree evaluating part 220 may first decide information on top 2 topics (i.e., topics car and Korea) with the highest probability of "me" corresponding to a topic among the topics car, Korea and book and then consider a specific object which has a high probability of appearing only with respect to the top 2 topics as an appropriate specific object with the highest relevance to the specific user "me" to thereby reduce the number of overall operations. By reference, as such, it may provide services including offering information on several specific objects with top n relevances to the specific user "me" to other users with the highest relevance to the specific user and this may be applied even to an example as below.

Furthermore, the similarity degree evaluating part 220 in accordance with the second example embodiment of the present invention may perform a function of deciding a specific object with the highest relevance to multiple specific users by expanding a concept of 1:n matching between a user and objects.

More specifically, the similarity degree evaluating part 220 in accordance with the second example embodiment of the present invention may acquire respective probabilities of respective specific users having relationships with an x-th topic (where x is 1 or more and n or less) and then a probability of the specific users having the x-th topic at the same time among the n topics by multiplying the already acquired respective probabilities to thereby determine information on top h topics with top h probabilities and then decide top k objects with top k probabilities of respective objects appearing with respect to the top h topics as appropriate specific objects with top k relevances to the multiple specific users. But it is not limited to this and it will be able to reproduce the present invention by applying various examples.

Finally, the recommendation information providing part 230 in accordance with the second example embodiment of the present invention may conduct a function of selecting a specific other user(s) with a high relevance to the specific user and providing information on the top k specific objects with top k relevances to the specific users to the specific other user(s). The first example embodiment of the present invention as explained above may be applied to the performance of the recommendation information providing part 230 which may select a specific other user with a high relevance to the specific user but it is not limited to this and it will be able to reproduce the present invention by applying various examples.

In accordance with the present invention, because degrees of similarity between the specific user and other users are acquired by using topic information as an inclusive concept, even if there are plenty of types of objects, it will be possible to find other users who have similar preference more widely and more accurately.

In accordance with the present invention, a specific object pre-selected by the specific user can be recommended to other users with similar preference to the specific user more rapidly and more accurately.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for recommending other users who have similar preference with one or more specific users comprising the steps of:
   (a) acquiring information on objects selected, respectively, by one or more specific users and random other users, wherein the random other users include 1-st to r-th other users while the objects include 1-st to s-th objects and a specific object is selected among the 1-st to s-th objects by the specific users;
   (b) acquiring information on topics which include 1-st to n-th topics by dividing the objects into n groups by referring to one or more characteristics of each object;
   (c) determining to which topic the one or more specific users and the random other users respectively correspond;
   (d) determining a probability of the one or more specific users ($U_1$) and the k-th other user ($U_2$), at the same time, having selected the specific object (O), $P(O, U_1, U_2)$, by referring to correspondence relationships between user information which includes: information on the one or more specific users and the k-th other user, topic information, and information relating objects to topics, wherein k is between one and r, by evaluating a degree of user similarity between the one or more specific users compared to each other user, comprising:
      (d1) determining $P(O|T)$, the probability of the specific object appearing in the state of a random topic, and $P(T|U)$, the probability of the random topic appearing in the state of both the one or more specific users and the k-th other users;
      (d2) multiplying the $P(O|T)$ by the $P(T|U)$ for each of the 1-st to n-th topics;
      (d3) summing the multiplied respective values for the 1-st to n-th topics;
      (d4) evaluating the degree of user similarity by multiplying the summed value by $P(O)$, the probability of the specific object appearing independently; and
   (e) recommending one or more specific other users among the random other users who are ranked in top levels in terms of the degree of user similarity as appropriate users who have similar preference with the one or more specific users.

2. The method of claim 1 wherein $P(T|U)$ is evaluated by multiplying $P(T|U_1)$, the probability of the random topic appearing in the state of the one or more specific users, by $P(T|U_2)$, the probability of the random topic appearing in the state of the k-th other user.

3. The method of claim 1 wherein the topic information is at a hidden state without being disclosed to both the one or more specific users and the random other users.

4. The method of claim 1 wherein, at the step (a), if the one or more specific users or the random other users creates a digital image of a certain object and registers the digital image, the information on the certain object is treated as being pre-selected by the specific users or the random other users.

5. The method of claim 1 wherein, if the one or more specific users includes 1-st to m-th users, $P(T|U_1)$, the probability of the random topic appearing in the state of one or more specific users is evaluated by multiplying each probability of the random topic appearing in the state of each specific user.

6. A method for recommending one or more specific objects corresponding to preference of one or more specific users to other users, comprising the steps of:
   (a) acquiring information on one or more objects the specific users pre-selected among all of the objects;

(b) acquiring information on topics which include 1-st to n-th topics by dividing the objects into n groups in reference to one or more characteristics of each object;

(c) determining to which topic the specific users corresponds by referring to the information on the objects pre-selected by the specific users;

(d) evaluating a degree of object similarity determined at least in part based on:
  (d1) determining P(O|T), the probability of objects (O) being pre-selected by the one or more specific users appearing in the state of a random topic (T),
  (d2) determining P(T|U$_1$), the probability of the random topic appearing in the state of the one or more specific users (U$_1$),
  (d3) multiplying the P(O|T) by the P(T|U$_1$) for each of the 1-st to n-th topics
  (d4) summing the multiplied respective values for the 1-st to n-th topics to determine the degree of object similarity;
  (d5) setting k specific objects which rank top k in terms of the degree of object similarity as appropriate specific objects with top k relevances to the one or more specific users; and (e) providing information on the k specific objects to a specific other user with a high relevance to the specific user.

7. A method for recommending one or more specific objects corresponding to preference of one or more specific users to other users, comprising the steps of:

(a) acquiring information on one or more objects the specific users pre-selected among the whole objects;

(b) acquiring information on topics which include 1-st to n-th topics by dividing the objects into n groups by referring to one or more characteristics of each object;

(c) determining to which topic the specific users corresponds by referring to the information on the objects pre-selected by the specific users;
  (d1) determining information on top h topics (T) which have top h probabilities among respective probabilities of respective topics appearing in the state of the one or more specific users (U$_1$), P(T|U$_1$);
  (d2) determining top k objects (O) with top k probabilities among respective probabilities of respective objects appearing in the state of the top h topics, P(O|T);
  (d3) setting the top k objects as appropriate specific objects with the highest relevance to the one or more specific users; and (e) providing information on the k specific objects to a specific other user with a high relevance to the specific users.

8. The method of claim 7 wherein the probability of an x-th topic among the n topics appearing in the state of the 1-st to m-th users is evaluated by calculating the respective probabilities of the x-th topic appearing in the state of the 1-st to m-th users and multiplying the calculated respective probabilities.

9. A system for recommending specific other users who have similar preference with one or more specific users comprising:

a correspondence relationships determining part executed on a processor for (i) acquiring information on objects selected, respectively, by one or more specific users and random other users, wherein the random other users include 1-st to r-th other users while the objects include 1-st to s-th objects and a specific object is selected among the 1-st to s-th objects by the specific users, (ii) acquiring information on topics which include 1-st to n-th topics by dividing the objects into n groups by referring to one or more characteristics of each object and (iii) determining to which topic the specific users and the random other users respectively correspond;

a similarity degree evaluating part executed on a processor for evaluating a degree of user similarity by determining a probability of the one or more specific users (U$_1$) and the k-th other user (U$_2$), at the same time, having selected the specific object (O), P(O, U$_1$, U$_9$), by referring to correspondence relationships between user information which includes: information on the one or more specific users and the k-th other user, topic information, and information relating objects to topics, wherein k is between one and r, by evaluating a degree of user similarity between the one or more specific users compared to each other user, comprising:
  (1) determining P(O|T), the probability of the specific object appearing in the state of a random topic, and P(T|U), the probability of the random topic appearing in the state of both the one or more specific users and the k-th other users;
  (2) multiplying the P(O|T) by the P(T|U) for each of the 1-st to n-th topics;
  (3) summing the multiplied respective values for the 1-st to n-th topics;
  (4) evaluating the degree of user similarity by multiplying the summed value by P(O), the probability of the specific object appearing independently; and a recommendation information providing part executed on a processor for recommending one or more specific other users among the random other users who are ranked in top levels in terms of the degree of user similarity as appropriate users who have similar preference with the specific users.

10. The system of claim 9 wherein P(T|U) is evaluated by multiplying P(T|U$_1$), the probability of the random topic appearing in the state of the one or more specific users, by P(T|U$_2$) the probability of random topic appearing in the state of the k-th other users.

11. The system of claim 9 wherein the information on the topic is at a hidden state without being disclosed to both the one or more specific users and the random other users.

12. The system of claim 9 wherein, if the one or more specific users or the random other users creates a digital image of a certain object and registers the digital image, the correspondence relationships determining part treats the information on the certain object as being pre-selected by the specific users or the random other users.

13. The system of claim 9 wherein, if the one or more specific users includes 1-st to m-th users, the similarity degree evaluating part evaluates P(T|U$_1$), the probability of the random topic appearing in the state of the one or more specific users by multiplying each probability of the random topic appearing in the state of each specific user getting.

14. A system for recommending one or more specific objects corresponding to preference of one or more specific users to other users, comprising:

a correspondence relationships determining part executed on a processor for (i) acquiring information on topics which include 1-st to n-th topics by dividing objects into n groups in reference to one or more characteristics of each object, (ii) acquiring information on one or more objects the specific users pre-selected among the whole objects, and (iii) determining to which topic the specific users corresponds by referring to the information on the objects pre-selected by the one or more specific users;

a similarity degree evaluating part executed on a processor for evaluating a degree of object similarity determined at least in part based on:
  (1) determining P(O|T), the probability of objects (O) being pre-selected by the one or more specific users appearing in the state of a random topic (T),
  (2) determining P(T|$U_1$), the probability of the random topic appearing in the state of the one or more specific users ($U_1$),
  (3) multiplying the P(O|T) by the P(T|$U_1$) for each of the 1-st to n-th topics
  (4) summing the multiplied respective values for the 1-st to n-th topics to determine the degree of object similarity;
  (5) setting k specific objects which rank top k in terms of the degree of object similarity as appropriate specific objects with top k relevances to the one or more specific users; and
a recommendation information providing executed on a processor part for providing information on the k specific objects to a specific other user with a high relevance to the one or more specific users.

15. A system for recommending one or more specific objects corresponding to preference of one or more specific users to other users, comprising:
  a correspondence relationships determining part executed on a processor for (i) acquiring information on topics which include 1-st to n-th topics by dividing objects into n groups by referring to one or more characteristics of each object, (ii) acquiring information on an object(s) the specific users pre-selected among the whole objects, (iii) determining to which topic the one or more specific users corresponds by referring to the information on the objects pre-selected by the one or more specific users;
  a similarity degree evaluating part executed on a processor for:
    (1) determining information on top h topics (T) which have top h probabilities among respective probabilities of respective topics appearing in the state of the one or more specific users ($U_1$), P(T|$U_1$);
    (2) determining top k objects (O) with top k probabilities among respective probabilities of respective objects appearing in the state of the top h topics, P(O|T);
    (3) setting the top k objects as appropriate specific objects with the highest relevance to the one or more specific users;
  a recommendation information providing part executed on a processor for providing information on the k specific objects to a specific other user with a high relevance to the specific users.

16. The system of claim 15 wherein the similarity degree evaluating part evaluates the probability of an x-th topic among the n topics appearing in the state of the 1-st to m-th users by calculating the respective probabilities of the x-th topic appearing in the state of the 1-st to m-th users and multiplying the calculated respective probabilities.

17. One or more non-transitory computer-readable recording media having stored thereon a computer program that, when executed by one or more processors, causes the one or more processors to perform acts including:
  acquiring information on objects selected, respectively, by one or more specific users and random other users, wherein the random other users include 1-st to r-th other users while the objects include 1-st to s-th objects and a specific object is selected among the 1-st to s-th objects by the specific users;
  acquiring information on topics which include 1-st to n-th topics by dividing the objects into n groups by referring to one or more characteristics of each object;
  determining to which topic the specific users and the random other users respectively correspond;
  (d) determining a probability of the one or more specific users ($U_1$) and the k-th other user ($U_2$), at the same time, having selected the specific object (O), P(O, $U_1$, $U_2$), by referring to correspondence relationships between user information which includes: information on the one or more specific users and the k-th other user, topic information, and information relating objects to topics, wherein k is between one and r, by evaluating a degree of user similarity between the one or more specific users compared to each other user, comprising:
    (d1) determining P(O|T), the probability of the specific object appearing in the state of a random topic, and P(T|U), the probability of the random topic appearing in the state of both the one or more specific users and the k-th other users;
    (d2) multiplying the P(O|T) by the P(T|U) for each of the 1-st to n-th topics;
    (d3) summing the multiplied respective values for the 1-st to n-th topics;
    (d4) evaluating the degree of user similarity by multiplying the summed value by P(O), the probability of the specific object appearing independently; and
  recommending one or more specific other users among the random other users who are ranked in top levels in terms of the degree of user similarity as appropriate users who have similar preference with the one or more specific users.

* * * * *

UNITED STATES PATENT AND TRADEMARK OFFICE
CERTIFICATE OF CORRECTION

Page 1 of 1

PATENT NO. : 8,484,209 B2
APPLICATION NO. : 13/299294
DATED : July 9, 2013
INVENTOR(S) : Kim et al.

It is certified that error appears in the above-identified patent and that said Letters Patent is hereby corrected as shown below:

In the Claims

In column 15, at line 36, claim 7 delete, "objectspre-selected" and insert -- objects pre-selected --.

In column 16, at line 10, claim 8 delete, "$P(O, U_1, U_9)$" and insert -- $P(O, U_1, U_2)$ --.

In column 16, at line 55, claim 13 after, -- user -- delete "getting".

Signed and Sealed this
Eighteenth Day of March, 2014

Michelle K. Lee
*Deputy Director of the United States Patent and Trademark Office*